Aug. 7, 1951
J. W. THORP
2,563,757
ALL MOVABLE HORIZONTAL TAIL
Filed July 23, 1945
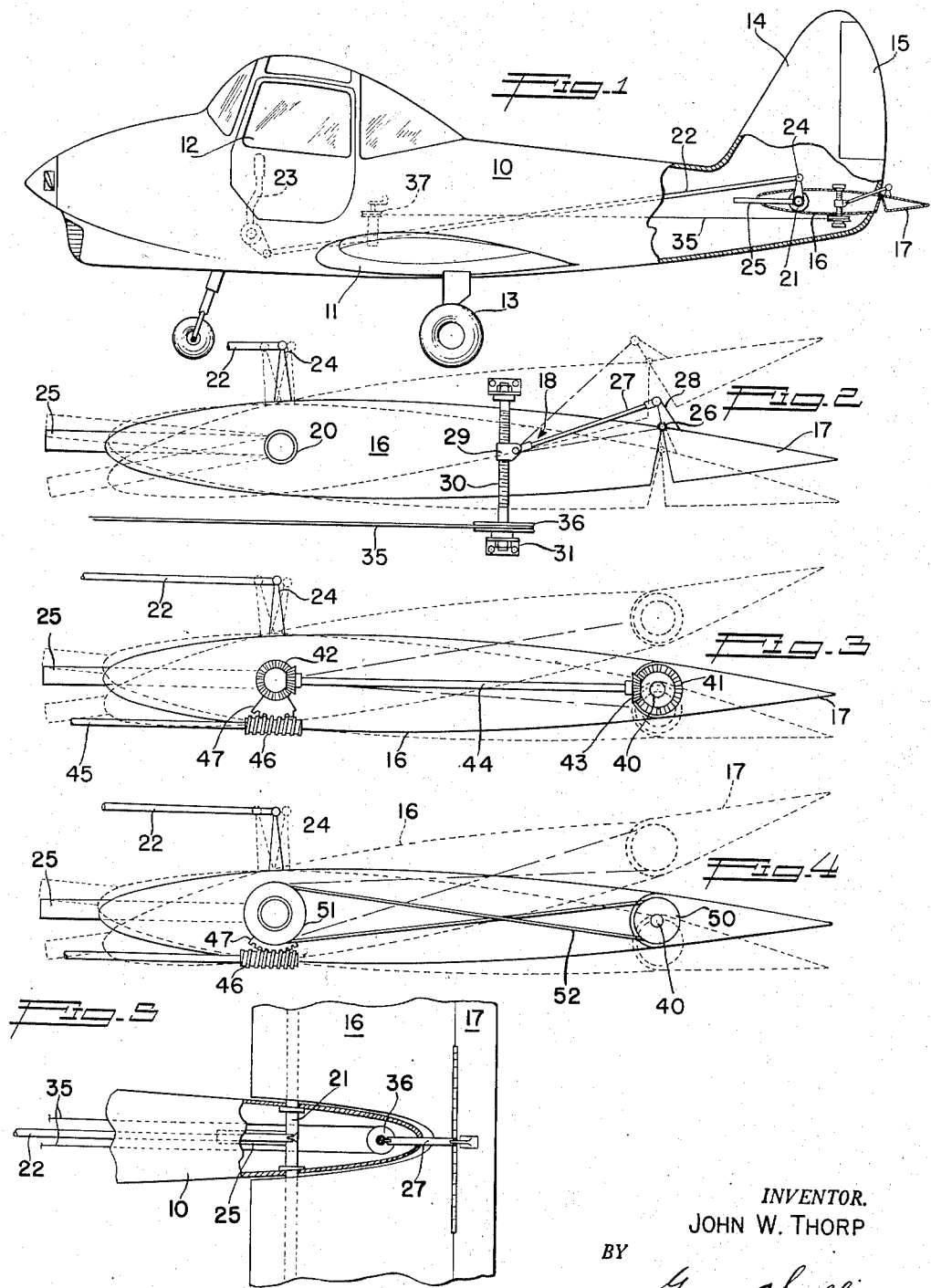
INVENTOR.
JOHN W. THORP
BY
George C. Sullivan
Agent Patented Aug. 7, 1951

2,563,757

UNITED STATES PATENT OFFICE 2,563,757

ALL-MOVABLE HORIZONTAL TAIL

John W. Thorp, Burbank, Calif., assignor to Lockheed Aircraft Corporation, Burbank, Calif.

Application July 23, 1945, Serial No. 606,662

2 Claims. (Cl. 244—87)

This invention relates to control and stabilizing means of aircraft, and relates more particularly to the horizontal tail elements of airplanes.

The horizontal tail of a conventional airplane has two primary functions and is usually proportioned and designed with a view of satisfactorily performing these functions. These two primary functions are (1) the provision or maintenance of both static and dynamic longitudinal stability when the center of gravity of the airplane is in its most rearward position under some critical power on low speed flight condition and (2) the supplying of a sufficient downward force at the rear of the fuselage to rotate the airplane to its maximum unstalled angle of attack in a landing condition with the center of gravity of the airplane in its most forward position. The conventional elevator has distinct tendency to float in the direction of the resultant wind at the tail of the airplane so that there is markedly reduced longitudinal stability when the controls are free, than when fixed. Furthermore, in landing an airplane equipped with the conventional horizontal tail, the forward portion of the horizontal stabilizer has an effect counter to that of the elevator, with the result that the conventional combination of the horizontal stabilizer and elevator is extremely inefficient in the landing attitude of the airplane.

It is an important object of this invention to provide a horizontal tail means providing a higher degree of stability with the controls free than with the controls fixed, and which is more efficient in the landing attitude than conventional horizontal tail structures. The horizontal tail means of the invention embodies a pivoted controllable main surface, and a flap having an anti-servo action coupled to produce free control stability. In landing the airplane, the leading edge of the main surface is deflected downwardly, producing a downward tail force and simultaneously the anti-servo flap moves upwardly to increase the downward force at the tail. Thus the horizontal tail of the invention overcomes the above mentioned shortcomings or undesirable features of conventional horizontal tails employing fixed main surfaces.

Another object of the invention is to provide a horizontal tail of reduced weight and cost, and producing less drag than conventional horizontal tails. The tail structure is more efficient in the two most critical operational conditions and does not require the large control and stabilizing areas found in the conventional structures. The arrangement of the invention also lends itself to extremely simple design and construction, further reducing the weight and cost.

It is a further object of the invention to provide a horizontal tail of the character above referred to that does not require the employment of booster controls even in relatively large airplanes. The surface proportions, hinge positions and link ratios of the improved tail may be adjusted and related to obtain a wide range of control forces having given normal force coefficient, thus avoiding the need for boosters in airplanes of the proportions where boosters have heretofore been required.

A further object of the invention is to provide a horizontal tail of the character above mentioned embodying simple, effective means for adjusting the anti-servo tab with respect to the principal surface, and thus alter the free float position of the horizontal tail to control the trim speed of the airplane. The means for adjusting the tab is associated with the linkage for automatically producing the anti-servo motion of the flap and transmitting forces from the tab to the main surface when the controls are free.

Other objectives and features of the invention will become apparent from the following detailed description of typical embodiments of the invention in which:

Figure 1 is a side elevation of an airplane provided with the horizontal tail of the invention with certain parts broken away to appear in vertical cross section;

Figure 2 is an enlarged schematic edge or side elevation of the horizontal tail with broken lines illustrating different positions of the parts;

Figure 3 is a view similar to Figure 2 illustrating another form of the invention;

Figure 4 is a view similar to Figure 2 illustrating still another embodiment of the invention; and Figure 5 is a fragmentary plan view of the tail portion of the airplane illustrating the structure of Figure 4 with certain parts appearing in horizontal cross section.

The horizontal tail construction of the invention is adapted for application to and embodiment in airplanes of widely varying types and sizes, and is capable of considerable variation to suit it for given applications. In the following detailed description I will refer to the typical embodiments illustrated in the accompanying drawings, it being understood that the invention is not to be construed as restricted as to the particular details herein set forth.

In Figure 1 I have illustrated an airplane comprising a fuselage 10, wings 11 and a cockpit 12.

The airplane is further provided with suitable landing gear 13 and the usual vertical stabilizer 14 equipped with a directional control surface or rudder 15. The present invention is not concerned with these elements except insofar as they may occur in combination with features and elements of the invention. The horizontal tail illustrated in Figures 1 and 2 comprises a main surface 16 supported for pivotal or angular movement, a tab 17 hinged on the main surface and means 18 for operating the tab.

The main stabilizing and control surface element 16 is preferably an airfoil shaped member, as illustrated, although if desired, it may be a flat surface element. The main surface 16 is arranged to extend laterally from each side of the aft portion of the fuselage 10 in accordance with the usual practice, it being apparent that where the airplane has spaced tail booms, the surface 16 may be arranged between the booms. As best illustrated in Figure 5, it is preferred to employ a single continuous main surface element 16 formed to straddle the aft end of the fuselage. The trailing edge of the main surface 16 is preferably continuous and uninterrupted to support a single continuous tab or flap 17. This is not essential, and on larger airplanes the surface 16 may be divided. In accordance with the invention, the main surface 16 is mounted for angular or pivotal movement about a horizontal axis. In the arrangement schematically illustrated in the drawings, the main surface element 16 is carried by a horizontal shaft or torque tube 20 suitably supported at 21 in the fuselage. It is preferred to mount the main surface 16 so that its axis of movement is well forward of its central axis to obtain proper control force variations with surface motion, and it is to be understood that the position of the axis of movement of the main surface 16 may vary in accordance with the action desired in the particular airplane.

The main surface element 16 may be controlled or operated by a suitable control means comprising a rod 22 extending from a stick or lever 23 in the cockpit to a horn 24 on the torque tube 20. If desired, a counterbalancing means may be associated with the surface element 16, but is not essential to the invention. In the drawings I have shown a tube 25 suitably secured to the torque tube 20 to extend forwardly in the fuselage 10. The counterbalancing tube 25 may contain lead or other material having a substantial specific gravity.

The flap 17 is arranged at the trailing edge of the main surface 16 and is supported for independent pivotal movement about an axis parallel with the axis of movement of the main surface. The flap 17 is preferably shaped to complete the air foil configuration of the main surface, and as illustrated, a suitable hinge means 26 connects the forward upper corner portion of the flap with the aft edge part of the main surface. The opposing faces of the main surface element 16 and the flap 17 are in downwardly divergent relation to allow downward as well as upward angular displacement of the flap 17 relative to the main surface. The proportions of the flap will vary with the particular airplane, and the flap may extend along any portion of or the entire length of the main surface.

The means 18 for operating the flap 17 serves to produce movement or deflection of the flap simultaneously with the deflection of the main surface 16, and in the same direction as, but through a greater angle than the main surface. The means 18 is also such that the flap 17 may be adjusted with respect to the main surface at the will of the pilot, to alter the "free float" position of the horizontal tail assembly and thus control the trim speed of the airplane.

In Figures 1 and 2 the operating means is a link system comprising a link 27 pivotally connected with an upstanding horn 28 on the flap 17 and extending forwardly into the aft end of the fuselage. The forward end of the link 27 is pivotally connected with a traveling nut 29 operable along a screw threaded shaft 30. The shaft 30 is vertically disposed and is supported by suitable brackets or journals 31 in the fuselage. The nut 29 forms a normally stationary anchor for the link 27 and upon deflection or movement of the main surface 16, the linked coupling causes the flap 17 to move in the same direction and at a greater rate than the main surface.

It will be observed that the position of the nut 29 on the threaded shaft 30 determines the position of the flap 17 relative to the main surface. The invention provides means for rotating the shaft 30 to vary the position of the nut 29 and thus adjust the flap 17 with respect to the main surface 16. This means includes a cable 35 operating over a pulley 36 fixed on the shaft 30 and extending to a suitable manual control or operating means 37 in the cockpit 12. It will be seen that upon operation of the control 37 the flap 17 is pivoted or adjusted relative to the main surface 16. Thus the link, nut, and horn 27—28—29 which produce automatic accelerated movement of the flap 17 upon angular movement of the main surface 16 form elements of the means for effecting independent movement or adjustment of the flap.

It is believed that the operation of the structure illustrated in Figures 1 and 2 will be apparent from the foregoing detailed description. However, the operation of the tail structure will be set forth following the description of the other illustrated embodiments of the invention.

The horizontal tail of Figure 3 includes the main surface 16 and the flap 17 which are substantially the same as in Figures 1 and 2. The main surface is supported by the torque tube 20 and is operated by the control system 22—23—24 described above. In this construction the flap 17 may be hingedly connected with the trailing edge of the main surface by a torque tube 40. The construction of Figure 3 is characterized by a gear train for producing movement of the flap proportionate to movement of the principal surface. A bevel gear 41 is fixed to the torque tube 40 and a similar but smaller bevel gear 42 is rotatable on the torque tube 20. Bevel pinions 43 are fixed to a suitably supported shaft 44 and mesh with the gears 41 and 42. With this geared coupling, movement of the main surface 16 produces simultaneous movement of the flap 17 at a speed greater than main surface movement so that upon a given displacement of the main surface, the flap is displaced in the same direction but to a greater extent. The coupling is such that when the flap 17 is displaced with the controls free, the main surface 16 is displaced in the same direction, but through a smaller angle. It is to be understood that the ratio of the geared coupling may be varied to obtain any selected relationship between the extent of movement of the main surface 16 and the flap.

The means for producing independent movement of the flap 17 includes a rotatable control shaft 45 operated by a suitable control in the cockpit 12. A worm 46 is fixed to the shaft 45 and cooperates with a segment 47 fixed to or formed on the bevel gear 42. It will be apparent that upon rotation of the shaft 45 the flap 17 is pivoted or moved about its hinge axis. Further, it will be observed that the worm 46 meshing with the segment 47 normally holds the gear 42 against rotation so that upon displacement of the tail surfaces with the controls free, the pinion 43 rolls upon the gear and thus rotates the shaft 44 to produce the proportionate movement of the flap and main surface.

The embodiment illustrated in Figures 4 and 5 is similar to that of Figure 3 but differs therefrom in that it incorporates a pulley and cable coupling instead of the geared coupling. A pulley 50 is fixed on the torque tube 40 and a similar pulley 51 carrying the worm gear segment 47 is freely rotatable on the torque tube 20. A crossed belt or cable 52 extends between and operates over the pulleys 50 and 51. The action of this belt and pulley drive or coupling is the same as with the gearing of Figure 3.

The operation of the several forms of the invention is substantially identical and is briefly described below. Upon operation of the cockpit control 23, the main surface 16 is rotated about the axis of its torque tube 20 and the flap 17 is caused to move in the same direction as the trailing portion of the main surface but at an increased speed to travel through a greater angle. When bringing the airplane to the landing attitude, the control is operated to deflect the leading edge of the main surface 16 downwardly, producing a downward tail force. At the same time the link coupling 27—28, the geared coupling 41—42—43—44 or the pulley and cable coupling 50—51—52 causes upward movement of the flap 17 to a greater angle than the main surface. The upward displacement of the flap 17 increases the downward tail force. A similar but reverse action occurs when the control is operated to deflect the leading edge of the main surface 16 upwardly. Where both the main surface 16 and the flap 17 are effective in producing either an upward or a downward tail force as the case may be, the horizontal tail of the invention is more efficient than the conventional tails wherein the fixed main surface acts counter to the elevator. The increased efficiency of the horizontal tail of this invention makes it possible to materially reduce the size and weight of the assembly.

When the control is in the free condition, the linked all movable horizontal tail is in itself stable. In the event the main surface 16 is deflected in either direction from a trim condition, the linkage or coupling above described causes the flap 17 to be displaced to a position where it has an anti-servo effect. This automatic displacement of the coupled flap 17 tends to return the main surface 16 to the original trim position. The broken lines of Figures 2, 3 and 4 illustrates various positions of the main surface 17 and the positions simultaneously assumed by the anti-servo 17.

Having described only typical forms of the invention, I do not wish to be limited to the specific details herein set forth, but wish to reserve to myself any variations or modifications that may appear to those skilled in the art or fall within the scope of the following claims.

I claim:

1. In an airplane having relatively stationary structure the combination of; a principal horizontal tail surface supported on said structure for movement about a horizontal axis spaced between its leading and trailing edges, an anti-servo flap hinged to the trailing edge portion of the principal surface for movement about an axis parallel with the first named axis, means operable upon deflection of the principal surface to deflect the flap in the same direction but through a greater angle comprising a threaded shaft rotatably supported on said structure to have a vertical longitudinal axis, a traveling nut on the shaft, an arm on the flap, and a link extending between and pivotally connected with the nut and arm, and means for adjusting the flap with respect to the principal surface including a control operable to rotate the shaft to advance said nut therealong.

2. In an airplane having relatively stationary structure the combination of; a principal horizontal tail surface supported by said structure for movement about a horizontal axis spaced between its leading and trailing edges, an anti-servo flap hinged to the trailing end of the principal surface for movement about an axis parallel with the first named axis, means for moving the principal surface about said first named axis, means operable upon deflection of the principal surface about said first named axis to deflect the flap in the same direction but through a greater angle, the last named means comprising a threaded shaft supported by said structure for rotation about a generally vertical relatively stationary axis spaced rearwardly from the axis of movement of the principal tail surface, a traveling nut on the shaft, an arm on the flap, and a link extending between and pivotally connected with the arm and nut to operatively connect the arm and nut and to hold the nut against rotation, and means for trimming the flap with respect to the principal surface comprising a remote control for rotating the shaft to advance the nut along the shaft.

JOHN W. THORP.

REFERENCES CITED

The following references are of record in the file of this patent:

UNITED STATES PATENTS

| Number | Name | Date |
|---|---|---|
| 1,766,025 | Junkers | June 24, 1930 |
| 1,802,226 | Torkelson | Apr. 21, 1931 |
| 2,313,800 | Burroughs, Jr. | Mar. 16, 1943 |
| 2,357,465 | Focht | Sept. 5, 1944 |
| 2,435,922 | Davis | Feb. 10, 1948 |

FOREIGN PATENTS

| Number | Country | Date |
|---|---|---|
| 304,129 | Great Britain | Feb. 27, 1930 |
| 496,054 | Great Britain | Nov. 24, 1938 |
| 519,337 | Great Britain | Mar. 21, 1940 |
| 542,944 | Great Britain | Feb. 3, 1942 |